United States Patent
Kazama et al.

(10) Patent No.: US 9,075,606 B2
(45) Date of Patent: Jul. 7, 2015

(54) STORAGE APPARATUS AND METHOD OF DETERMINING DEVICE TO BE ACTIVATED

(71) Applicant: FUJITSU LIMITED, Kawasaki-shi (JP)

(72) Inventors: Satoshi Kazama, Kawasaki (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 319 days.

(21) Appl. No.: 13/780,254

(22) Filed: Feb. 28, 2013

(65) Prior Publication Data

US 2013/0262904 A1     Oct. 3, 2013

(30) Foreign Application Priority Data

Mar. 30, 2012   (JP) ................................ 2012-079493

(51) Int. Cl.
| | |
|---|---|
| G06F 1/00 | (2006.01) |
| G06F 11/30 | (2006.01) |
| G06F 1/32 | (2006.01) |
| G06F 3/06 | (2006.01) |

(52) U.S. Cl.
CPC ............ *G06F 1/3221* (2013.01); *G06F 1/3275* (2013.01); *G06F 3/0689* (2013.01); *G06F 1/3268* (2013.01); *Y02B 60/1246* (2013.01)

(58) Field of Classification Search
CPC ... G06F 3/0689; G06F 3/0683; G06F 3/0644; G06F 1/3275; G06F 3/0629; G06F 3/0653; G06F 3/0625
See application file for complete search history.

(56) References Cited

U.S. PATENT DOCUMENTS

| | | | |
|---|---|---|---|
| 7,849,263 B1* | 12/2010 | French | 711/114 |
| 2008/0259710 A1* | 10/2008 | Wenzel et al. | 365/226 |
| 2009/0119529 A1 | 5/2009 | Kono et al. | |
| 2010/0023685 A1 | 1/2010 | Ikejiri et al. | |
| 2010/0070731 A1 | 3/2010 | Mizuno et al. | |
| 2010/0325348 A1* | 12/2010 | Rafizadeh et al. | 711/103 |
| 2011/0035565 A1* | 2/2011 | Barrall | 711/170 |
| 2012/0030424 A1* | 2/2012 | Nunez et al. | 711/114 |

FOREIGN PATENT DOCUMENTS

| | | |
|---|---|---|
| JP | 2009-116436 A | 5/2009 |
| JP | 2010-033261 A | 2/2010 |
| JP | 2010-072753 A | 4/2010 |

* cited by examiner

*Primary Examiner* — Jaweed A Abbaszadeh
*Assistant Examiner* — Xuxing Chen
(74) *Attorney, Agent, or Firm* — Fujitsu Patent Center

(57) ABSTRACT

In a storage apparatus, a calculation unit calculates first power consumption by adding the power consumption of a first storage device not in use to the total power consumption of a plurality of storage devices in operation, and calculates second power consumption by adding the power consumption of a second storage device not in use to the total power consumption of the plurality of storage devices in operation, and subtracting therefrom the power consumption of one of the plurality of storage devices in operation, from which data is movable to the second storage device. A determination unit determines to activate the first storage device when the second power consumption is not lower than the first power consumption, and determines to activate, the second storage device when the second power consumption is lower than the first power consumption.

9 Claims, 14 Drawing Sheets

211a ELECTRIC POWER INFORMATION TABLE

| TYPE No. | RAID LEVEL | DRIVE TYPE | NUMBER OF DRIVES | STORAGE CAPACITY | POWER CONSUMPTION |
|---|---|---|---|---|---|
| 0 | RAID5 | SSD | 5 | 400GB | 7W |
| 1 | RAID5 | TYPE 1 HDD | 6 | 644GB | 29W |
| 2 | RAID5+0 | TYPE 2 HDD | 12 | 17.8TB | 96W |
| ... | ... | ... | ... | ... | ... |

FIG. 4

212a RAID CONFIGURATION INFORMATION TABLE

| No. | RAID LEVEL | DRIVE TYPE | NUMBER OF DRIVES | STORAGE CAPACITY | POWER STATE |
|---|---|---|---|---|---|
| 0 | RAID5 | SSD | 5 | 400GB | ON |
| 1 | RAID5 | TYPE 1 HDD | 6 | 644GB | ON |
| 2 | RAID5 | TYPE 1 HDD | 6 | 644GB | ON |
| 3 | RAID5 | TYPE 1 HDD | 6 | 644GB | OFF |
| 4 | RAID5 | TYPE 1 HDD | 6 | 644GB | OFF |
| 5 | RAID5+0 | TYPE 2 HDD | 12 | 17.8TB | ON |
| 6 | RAID5+0 | TYPE 2 HDD | 12 | 17.8TB | OFF |
| ... | ... | ... | ... | ... | ... |

FIG. 5

212b RAID CONFIGURATION INFORMATION TABLE

| No. | RAID LEVEL | DRIVE TYPE | NUMBER OF DRIVES | STORAGE CAPACITY | DATA MOVEMENT PERMISSION | IOPS | POWER STATE |
|---|---|---|---|---|---|---|---|
| 0 | RAID5 | 2.5" SSD | 5 | 400GB | No | 30000 | ON |
| 1 | RAID5 | 2.5" OL-SAS | 6 | 644GB | No | 2000 | ON |
| 2 | RAID5 | 2.5" OL-SAS | 6 | 644GB | Yes | 2000 | ON |
| 3 | RAID5 | 2.5" OL-SAS | 6 | 644GB | Yes | 2000 | OFF |
| 4 | RAID5 | 2.5" OL-SAS | 6 | 644GB | Yes | 2000 | OFF |
| 5 | RAID5+0 | 3.5" OL-SAS | 12 | 17.8TB | Yes | 900 | ON |
| 6 | RAID5+0 | 3.5" OL-SAS | 12 | 17.8TB | Yes | 900 | OFF |
| ... | ... | ... | ... | ... | ... | ... | ... |

FIG. 12

HIGH-SPEED PROCESSING
212c   DETERMINATION
INFORMATION TABLE

| LUN No. | HIGH-SPEED PROCESSING |
|---------|----------------------|
| 0 | Yes |
| 1 | No |
| 2 | No |

FIG. 13

STORAGE APPARATUS AND METHOD OF DETERMINING DEVICE TO BE ACTIVATED

CROSS-REFERENCE TO RELATED APPLICATION

This application is based upon and claims the benefit of priority of the prior Japanese Patent Application No. 2012-079493, filed on Mar. 30, 2012, the entire contents of which are incorporated herein by reference.

FIELD

The embodiments discussed herein are related to a storage apparatus and a method of determining a device to be activated.

BACKGROUND

There has been widely used a storage system including a plurality of high-capacity storage devices, such as HDDs (Hard Disk Drives).

With the development of storage devices in scale and performance, the power consumption of each storage device has increased. This makes it more important to reduce the power consumption of the entire storage system. In view of this, for example, to optimize the configuration of a storage apparatus that uses a pool, there has been proposed a technique for providing the optimum configuration while ensuring policy, such as power saving performance or response performance, set by an administrator. Further, there has also been proposed a technique that realizes reduction of the power consumption, simplification of management, and enhancement of storage resource use efficiency.

Japanese Laid-open Patent Publication No. 2009-116436
Japanese Laid-open Patent Publication No. 2010-33261

When a ratio of a used storage area to a total storage area of an operating one of a plurality of storage devices exceeds a predetermined ratio, it sometimes occurs that an unused one of the plurality or storage devices is activated to increase the total storage capacity of the storage devices in operation. In doing this, if a storage device which consumes as low electric power as possible is put into operation, it is possible to reduce the power consumption of the whole system.

However, the above-mentioned method has a precondition that the storage devices having been in operation continue to be operated, and hence if a case is taken into consideration where any of the storage devices having been in operation is powered off, there is a possibility that the power consumption is further reduced.

SUMMARY

According to an aspect of the invention, a storage apparatus includes a control unit configured to calculate a first power consumption by adding a power consumption of a first storage device which has not been in use to a total power consumption of a plurality of storage devices in operation, calculate a second power consumption by adding a power consumption of a second storage device which has not been in use to the total power consumption of the plurality of storage devices in operation, and subtracting therefrom a power consumption of a storage device, from which data is movable to the second storage device, of the plurality of storage devices in operation, determine to activate the first storage device when the second power consumption is not lower than the first power consumption, and determine to activate the second storage device when the second power consumption is lower than the first power consumption.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram useful in explaining an electric power information table;

FIG. 5 is a diagram useful in explaining a RAID configuration information table;

FIG. 12 is a diagram useful in explaining a RAID configuration information table according to the fourth embodiment;

FIG. 13 is a diagram useful in explaining a high-speed processing determination information table.

DESCRIPTION OF EMBODIMENTS

Figure 1:
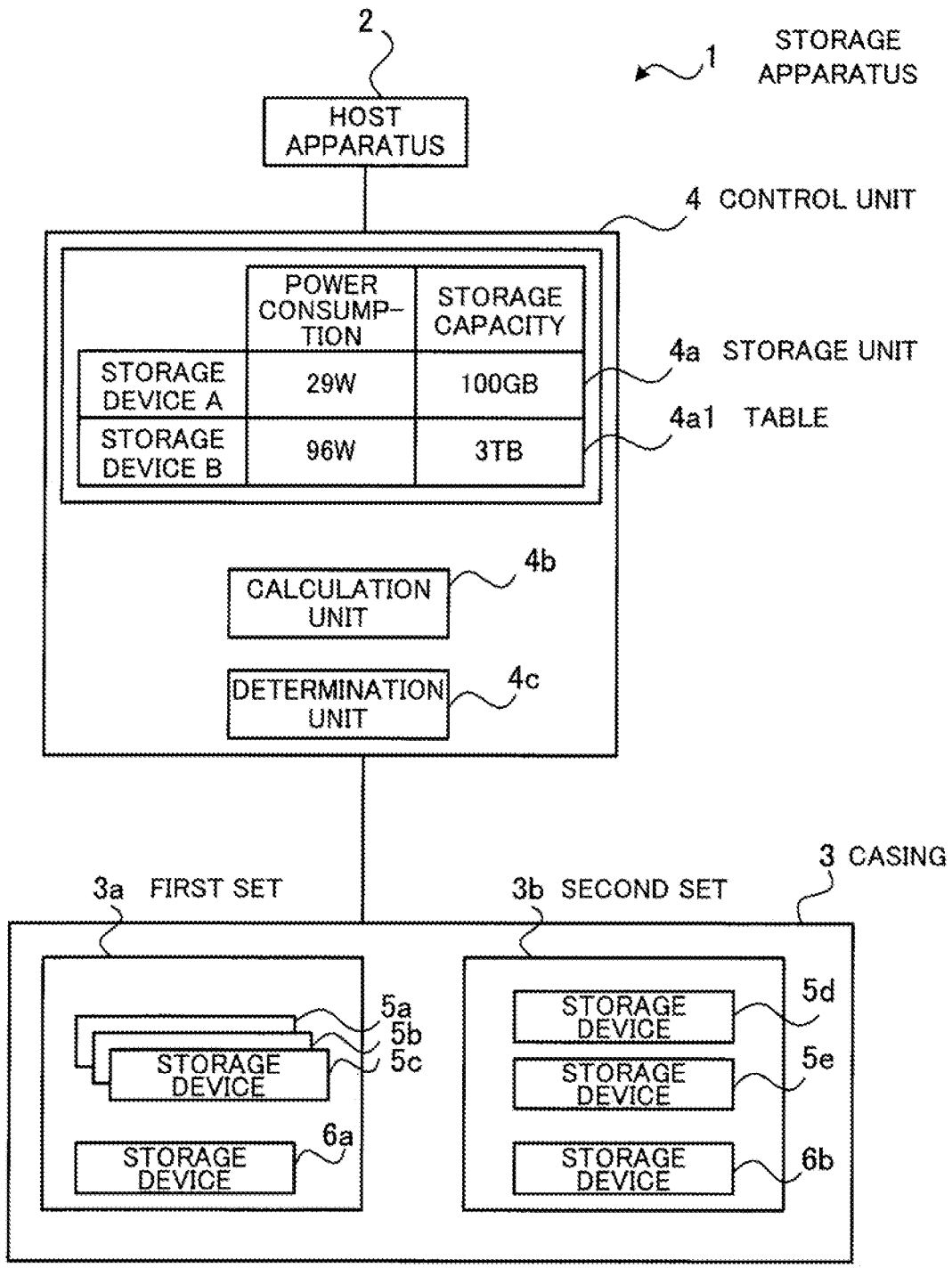
FIG. 1 illustrates a storage apparatus according to a first embodiment.

Several embodiments will be described below with reference to the accompanying drawings, wherein like reference numerals refer to like elements throughout.

(a) First Embodiment

FIG. 1 illustrates a storage apparatus according to a first embodiment.

The storage apparatus (computer), denoted by reference numeral 1, according to the first embodiment includes a control unit 4 that accesses a plurality of storage devices provided in a casing 3 according to an instruction from a host apparatus 2. Although FIG. 1 illustrates one control unit 4, the storage apparatus 1 may include two or more control units.

The storage devices provided in the casing 3 are devices for storing data, such as a plurality of HDDs (Hard Disk Drives) or SSDs (Solid State Drives). The casing 3 contains a first set 3a of storage devices in operation and a second set 3b of storage devices which have not been in use. The first set 3a has storage devices 5a, 5b, 5c, and 6a assigned thereto. The second set 3b has storage devices 5d, 5e, and 6b assigned thereto. The storage devices 5a, 5b, 5c, 5d, and 5e each have a power consumption of 29 W and a storage capacity of 100 GB. The storage devices 6a and 6b each have a power consumption of 96 W and a storage capacity of 3 TB.

The control unit 4 controls a process for accessing a storage device in response to a request from the host apparatus 2 for access to the storage device. For example, when the control unit 4 receives a request from the host apparatus 2 for reading out data stored in a storage device, the control unit 4 reads out the data requested to be read out from the associated storage device, and sends the read data to the host apparatus 2. Alternatively, when the control unit 4 receives a request from the host apparatus 2 for writing data into a storage device, the control unit 4 writes the data requested to be written into the associated storage device. Further, the control unit 4 may have a function of caching data stored in the storage devices.

The control unit 4 includes a storage unit 4a, a calculation unit 4b, and a determination unit 4c. The calculation unit 4b calculates a first power consumption by adding the power consumption of a first storage device, which has not been in use, to a total power consumption of the plurality of storage devices in operation. Further, the calculation unit 4b calculates a second power consumption by adding the power consumption of a second storage device, which has not been in use, to the total power consumption of the plurality of storage devices in operation, and subtracting therefrom the power consumption of a storage device of the plurality of storage devices in operation, from which data is movable to the second storage device. The determination unit 4c determines to activate the first storage device if the second power consumption is not lower than the first power consumption, and determines to activate the second storage device if the second power consumption is lower than the first power consumption.

The storage unit 4a may be realized by data storage areas provided in e.g. a RAM (Random Access Memory) included in the control unit 4. Further, the calculation unit 4b and the determination unit 4c may be realized by functions provided in a CPU (Central Processing Unit) included in the control unit 4.

The storage unit 4a stores a table 4a1 in which a power consumption and a storage capacity are recorded in association with each other on a storage device type basis. The storage devices 5a, 5b, 5c, 5d, and 5e each correspond to a storage device A, and the storage devices 6a and 6b each correspond to a storage device B.

Hereafter, the functions of the calculation unit 4b and the determination unit 4c will be described in detail with reference to FIG. 2.

Figure 2:
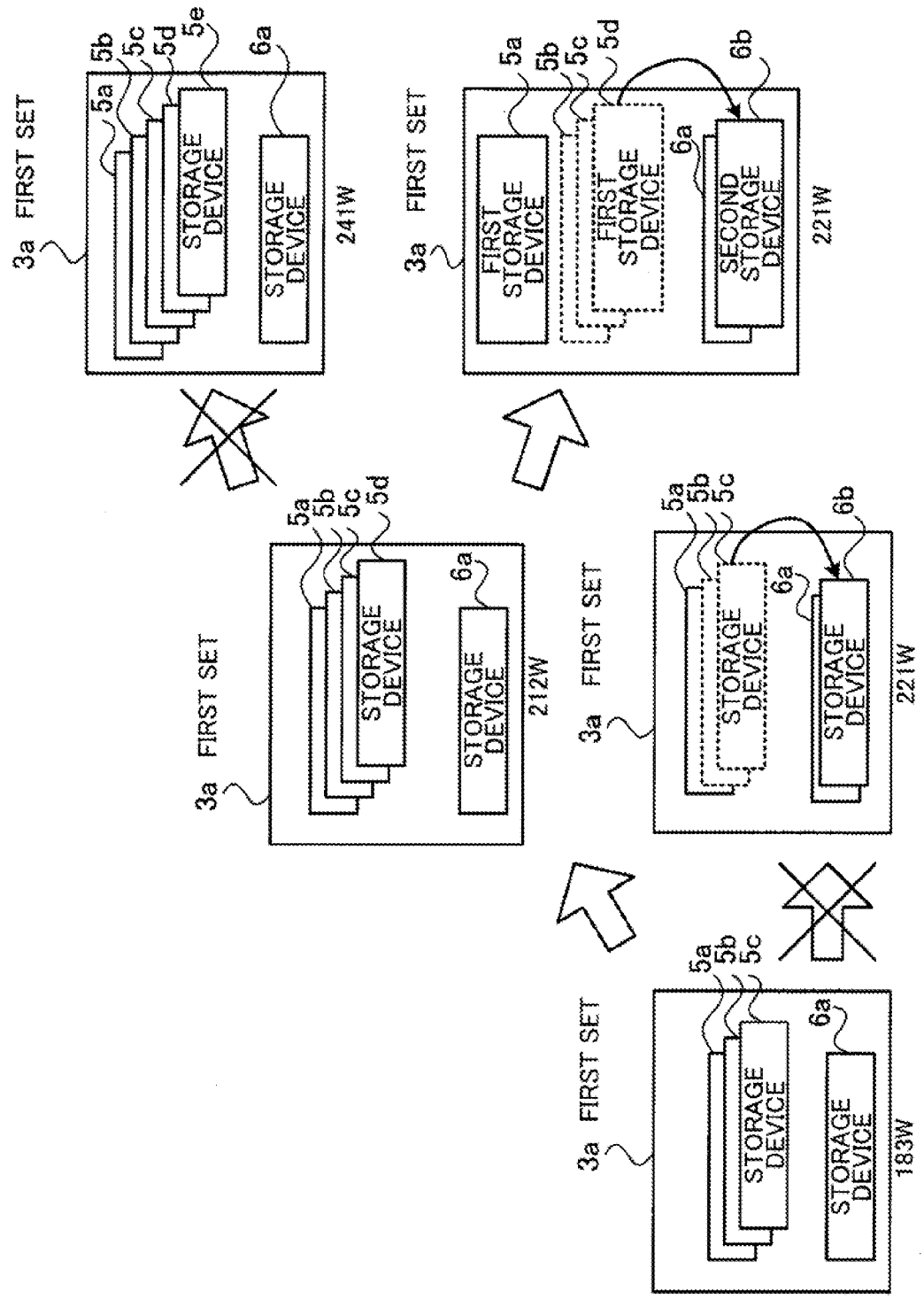
FIG. 2 is a diagram useful in explaining processing executed by the storage apparatus according to the first embodiment.

FIG. 2 is a diagram useful in explaining processing executed by the storage apparatus according to the first embodiment.

The calculation unit 4b and the determination unit 4c carry out the following processing when the usage ratio of each of the storage devices 5a, 5b, 5c, and 6a assigned to the first set 3a is not lower than a predetermined ratio (e.g. 60%). The usage ratio is a ratio of areas storing data to areas capable of storing data.

The calculation unit 4b calculates the first power consumption by adding the power consumption of the storage device 5d which consumes the least electric power of all the unused storage devices assigned to the second set 3b, to the total power consumption of the storage devices 5a, 5b, 5c, and 6a, assigned to the first set 3a. By using the power consumption of the storage device 5d which consumes the least electric power of all the storage devices assigned to the second set 3b for calculation of the first power consumption, it is possible to enhance the possibility of reducing the power consumption.

More specifically, the calculation unit 4b calculates 183 W (=29 W+29 W+29 W+96 W) as the total power consumption of the storage devices 5a, 5b, 5c, and 6a, assigned to the first set 3a, by consulting the table 4a1 stored in the storage unit 4a. Next, the calculation unit 4b calculates a first power consumption of 212 W by adding the power consumption of 29 W of the storage device 5d to the total power consumption of 183 W of the storage devices 5a, 5b, 5c, and 6a. The first power consumption represents the power consumption to be exhibited when the storage device 5d is assigned to the first set 3a.

Further, the calculation unit 4b calculates the second power consumption by adding the power consumption of the storage device 6b assigned to the second set 3b to the total power consumption of the storage devices 5a, 5b, 5c, and 6a, assigned to the first set 3a, and subtracting therefrom the total power consumption of the ones 5b and 5c, from which data is movable to the storage device 6b, of the storage devices 5a, 5b, 5c, and 6a. From which of the storage devices 5a, 5b, 5c, and 6a, data is movable to the storage device 6b, may be determined, for example, in the following manner: A designer determines candidates of a storage device from which data is movable, in advance, and storing the candidates in a table, not illustrated, stored in the control unit 4. In the present embodiment, it is assumed that the candidates from which data is movable are the storage devices 5b and 5c. The calculation unit 4b consults this table to select the storage devices 5b and 5c as the candidates from which data is movable, and determines whether or not an amount of free space in the storage device 6b secured when the data stored in the selected storage devices 5b and 5c is moved to the storage device 6b is not smaller than a predetermined amount. If the amount of free space in the storage device 6b secured when the data stored in the selected storage devices 5b and 5c is moved to the storage device 6b is not smaller than the predetermined amount, the calculation unit 4b determines that the data stored in the selected storage devices 5b and 5c may be moved to the storage device 6b. By employing the above-mentioned criteria, the usage ratio of the storage devices assigned to the first set 3a is made lower than the predetermined ratio after moving the data.

The second power consumption represents the power consumption of the first set 3a at the time that the storage devices 5b and 5c are replaced by the storage device 6b. Note that the storage device 6b is an example of the second storage device.

More specifically, the calculation unit 4b calculates 183 W as a total power consumption of the storage devices 5a, 5b, 5c, and 6a, assigned to the first set 3a. Then, the calculation unit 4b calculates 279 W as a total power consumption of the storage devices 5a, 5b, 5c, 6a, and 6b by adding the power consumption of 96 W of the storage device 6b to the total power consumption of 183 W of the storage devices 5a, 5b, 5c, and 6a. Next, the calculation unit 4b calculates the second power consumption of 221 W by subtracting a total power consumption of 58 W of the storage devices 5b and 5c, from which data is movable to the storage device 6b, from the power consumption of 279 W.

The second power consumption of 221 W is not lower than the first power consumption of 212 W, and hence the determination unit 4c determines to assign the storage device 5d to the first set 3a. As a result, the control unit 4 activates the storage device 5d, and assigns the same to the first set 3a.

Further, if the usage ratio of the storage devices assigned to the first set 3a becomes not lower than 60% again, or if the usage ratio of the storage devices is not lower than 50% at the time that the storage device 5d is assigned to the first set 3a, the control unit 4 executes the following processing:

The calculation unit 4b calculates the first power consumption by adding the power consumption of an unused storage device 5e assigned to the second set 3b, to the total power consumption of the storage devices 5a, 5b, 5c, 5d and 6a, assigned to the first set 3a. That is, the first power consumption represents the power consumption to be exhibited assuming that the storage device 5e is assigned to the first set 3a. Note that the storage device 5e is an example of the first storage device. More specifically, the calculation unit 4b calculates 212 W (=29 W×4+96 W) as the total power consumption of the storage devices 5a, 5b, 5c, 5d, and 6a, assigned to the first set 3a, by consulting the table 4a1 stored in the storage unit 4a. Then, the calculation unit 4b calculates the first power consumption of 241 W by adding the power consumption of 29 W of the storage device 5e to the total power consumption of 212 W of the storage devices 5a, 5b, 5c, 5d, and 6a.

Further, the calculation unit 4b calculates the second power consumption by adding the power consumption of the unused storage device 6b to the total power consumption of the plurality of storage devices 5a, 5b, 5c, 5d, and 6a in operation, and subtracting therefrom a total power consumption of the storage devices 5b, 5c, and 5d, from which data is movable to the storage device 6b, of the storage devices 5a, 5b, 5c, 5d, and 6a. That is, the second power consumption represents the power consumption to be exhibited assuming that the storage device 6b is assigned to the first set 3a. Note that the storage device 6b is an example of the second storage device. More specifically, the calculation unit 4b calculates 212 W as the total power consumption of the storage devices 5a, 5b, 5c, 5d, and 6a, assigned to the first set 3a. Then, the calculation unit 4b calculates 308 W as the total power consumption of the storage devices 5a, 5b, 5c, 5d, 6a, and 6b by adding the power consumption of 96 W of the storage device 6b to the total power consumption of 212 W of the storage devices 5a, 5b, 5c, 5d, and 6a.

Next, the calculation unit 4b calculates the second power consumption of 221 W by subtracting the total power consumption of 87 W of the storage devices 5b, 5c, and 5d, from which data is movable to the storage device 6b, from the total power consumption of 308 W.

The second power consumption of 221 W is lower than the first power consumption of 241 W, and hence the determination unit 4c determines to assign the storage device 6b to the first set 3a. As a result, the control unit 4 activates the storage device 6b, and assigns the same to the first set 3a. Next, the control unit 4 moves the data stored in the storage devices 5b, 5c, and 5d to the storage device 6b. Thereafter, the control unit 4 stops the operation of the storage devices 5b, 5c, and 5d.

According to the storage apparatus 1, the first power consumption and the second power consumption are compared, and a configuration of the storage apparatus in which the power consumption is lower is employed. This makes it possible to reduce the power consumption.

In the present embodiment, the power consumption is compared on a storage device basis. However, this is not limitative, but the power consumption may be compared between logical volumes to each of which a plurality of storage devices are assigned. In this case, the storage unit 4a stores power consumptions and storage capacities on a logical volume basis in association with each other, in advance.

The control unit 4 illustrated in FIG. 1 may be realized e.g. by an information processing apparatus (computer) including one or more processors and memories, and so forth. When the control unit 4 is realized by an information processing apparatus, for example, a program in which processing executed by the control unit 4 is written is provided. By storing the program in the memory of the information processing apparatus, and causing the processor to execute the program, the function of the control unit 4 is realized.

Hereafter, in a second embodiment, the disclosed storage apparatus will be described in detail.

(b) Second Embodiment

Figure 3:
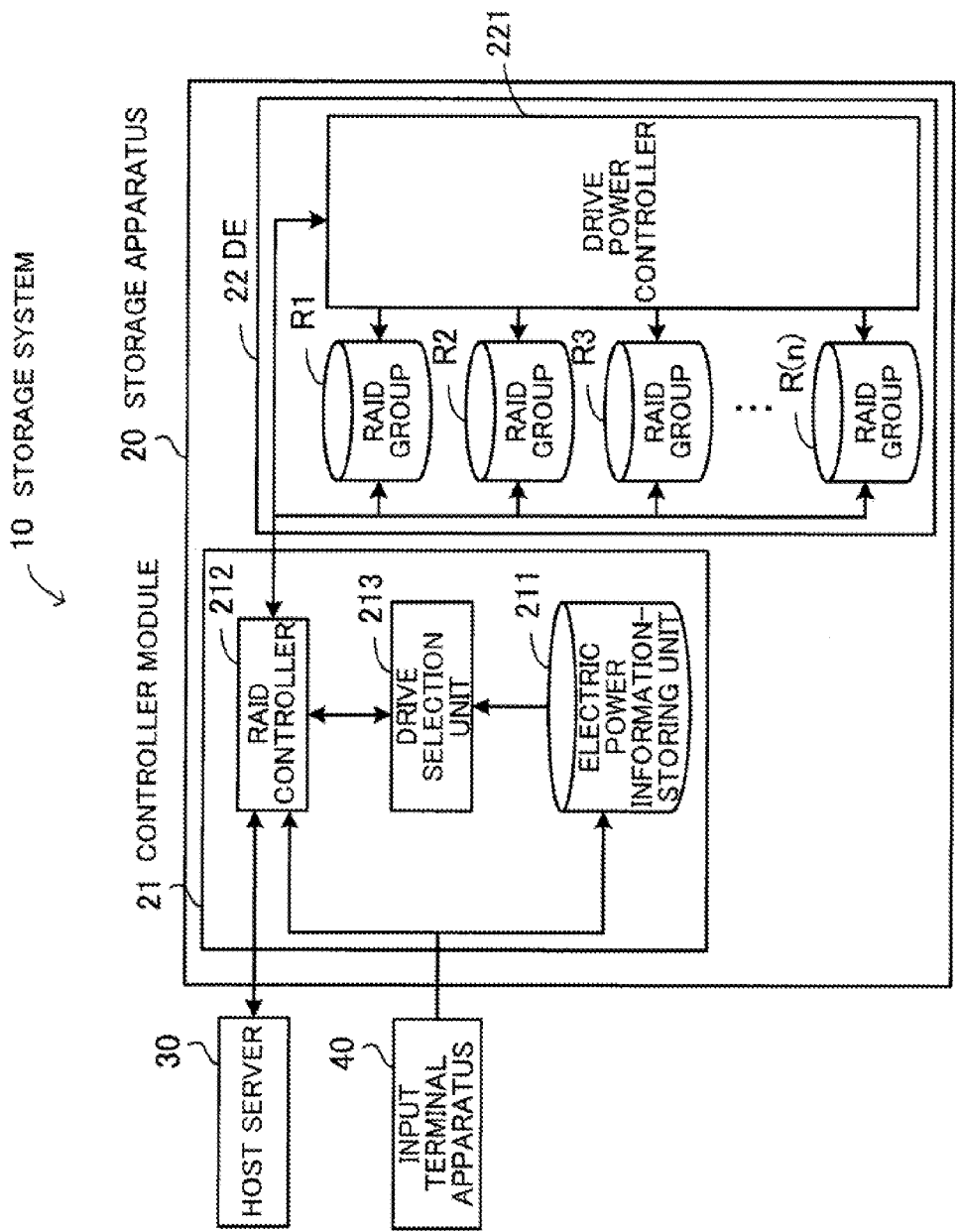
FIG. 3 illustrates an example of the arrangement of a storage system according to a second embodiment.

FIG. 3 illustrates an example of the arrangement of a storage system according to a second embodiment.

The storage system, denoted by reference numeral 10, includes a storage apparatus 20 and a host server 30. The storage apparatus 20 and the host server 30 are connected via a LAN (Local Area Network).

The storage apparatus 20 includes a controller module 21 and a drive enclosure 22. In the drive enclosure 22, a plurality of RAID (Redundant Arrays of Independent Disks) groups R1, R2, R3, . . . , R(n) are constructed by allocating some of areas of a plurality of hard disk drives.

The controller module 21 functions as a controller for controlling the RAID groups installed in the drive enclosure 22. Further, the controller module 21 provides data stored in the drive enclosure 22 to the host server via the LAN, as files.

The controller module 21 includes an electric power information-storing unit 211, a RAID controller 212, and a drive selection unit 213.

The electric power information-storing unit 211 holds an electric power information table which stores information on the power consumption of each RAID group. A designer writes information in the electric power information table by operating an input terminal apparatus 40.

FIG. 4 is a diagram useful in explaining the electric power information table.

The electric power information table, denoted by reference numeral 211a, has columns of a type No., a RAID level, a drive type, the number of drives, a storage capacity, and a power consumption. Information items arranged in a horizontal direction are associated with each other.

In the column of the type No., a number for identifying information items (records) associated with each other in the horizontal direction is written.

In the column of the RAID level, information for identifying a level of RAID is written.

In the column of the drive type, a type of physical drives assigned to each RAID croup is written.

In the column of the number of drives, the number of physical drives assigned to a RAID group is written.

In the column of the storage capacity, a total value of physical capacities of physical drives assigned to a RAID group is written.

In the column of the power consumption, a total value of electric power consumed during operation of the physical drives assigned to a RAID group is written. In the following description, the total power consumption of physical drives assigned to a RAID group is referred to as "the power consumption of the RAID group".

Referring again to FIG. 3, the description is continued.

The RAID controller 212 performs RAID control at physical drives assigned to each RAID group. More specifically, the RAID controller 212 controls the whole of the storage system 10, such as construction of a storage pool and a RAID group according to setting information from the input terminal apparatus 40, relaying of data between the host server 30 and the drive enclosure 22, and collection of status of each hard disk drive. Further, the RAID controller 212 holds a RAID configuration information table which stores information on physical drives assigned to each RAID group. A designer writes information in the RAID configuration information table by operating the input terminal apparatus 40.

FIG. 5 is a diagram useful in explaining the RAID configuration information table.

The RAID configuration information table, denoted by reference numeral 212a, has columns of No., a RAID level, a drive type, the number of drives, a storage capacity, and a power state. Information items arranged in a horizontal direction are associated with each other. The contents written in the respective columns of the RAID level, the drive type, the number of drives, and the storage capacity are the same as those recorded in the electric power information table 211a.

In the column of No., information for identifying a record is written.

In the column of the power state, information for distinguishing whether or not physical drives assigned to an associated RAID group are in operation is written. The power state "ON" indicates that the physical drives are in operation, and "OFF" Indicates that the physical drives are not in operation (at rest).

A set of RAID groups in a power-on state in the drive enclosure 22 is hereinafter referred to as the operating RAID set, and a set of RAID groups in a power-off state is hereinafter referred to as the non-operating RAID set.

Referring again to FIG. 3, the description is continued.

The drive selection unit 213 controls addition of a RAID group to the operating RAID set, and rearrangement of data. Specifically, the drive selection unit 213 refers to information on the usage ratio of a storage capacity of physical drives. If the usage ratio of the storage capacity of physical drives assigned to each RAID group belonging to the operating RAID set is not lower than a predetermined ratio, the drive selection unit 213 determines a RAID group to be added to the operating RAID set, out of the non-operating RAID set, using the RAID configuration information table 212a stored in the RAID controller 212 and the electric power information table 211a stored in the electric power information-storing unit 211.

More specifically, the drive selection unit 213 calculates a total value of power consumption of each RAID group belonging to the operating RAID set by referring to the column of the power consumption in the electric power information table 211a. Further, the drive selection unit 213 identifies a RAID group which consumes the least electric power of the RAID groups belonging to the non-operating RAID set (hereinafter referred to as the RAID_A).

Then, the drive selection unit 213 calculates the first power consumption by adding the power consumption of the RAID_A to the total value of the power consumption.

Further, the drive selection unit 213 calculates respective total values of the power consumption to be exhibited when the RAID groups belonging to the non-operating RAID set are each added to the operating RAID set and powered on, respectively. Then, the drive selection unit 213 identifies a RAID group which belongs to the non-operating RAID set and gives the smallest total value of the power consumption (hereinafter referred to as the RAID_B).

Then, the drive selection unit 213 calculates the second power consumption by subtracting the power consumption of a RAID group, from which data is movable to the RAID_B added to the operating RAID set, of the RAID groups belonging to the operating RAID set, from the total value of the power consumption.

Then, if the second power consumption is not lower than the first power consumption, the drive selection unit 213 determines to activate the RAID_A, whereas if not, the drive selection unit 213 determines to activate the RAID_B.

Then, the drive selection unit 213 outputs the electric power control information of the determined RAID group to the RAID controller 212. The electric power control information is power-on/off information on a RAID group-by-RAID group basis. The RAID controller notifies the drive enclosure 22 of the electric power control information.

Further, in a case where the drive selection unit 213 determines to activate the RAID_B, the drive selection unit 213 outputs data movement information to the RAID controller 212. The data movement information is information on movement of data from a RAID group of the RAID groups belonging to the operating RAID set, from which data is movable to the RAID_B added to the operating RAID set, to the RAID_B. Upon receipt of the data movement information, the RAID controller 212 executes the data movement between the RAID groups.

The drive enclosure 22 includes a drive power controller 221. When the power control information is notified to the drive enclosure 22, the drive power controller 221 powers on or off each RAID group based on the power control information notified from the RAID controller 212.

Figure 6:
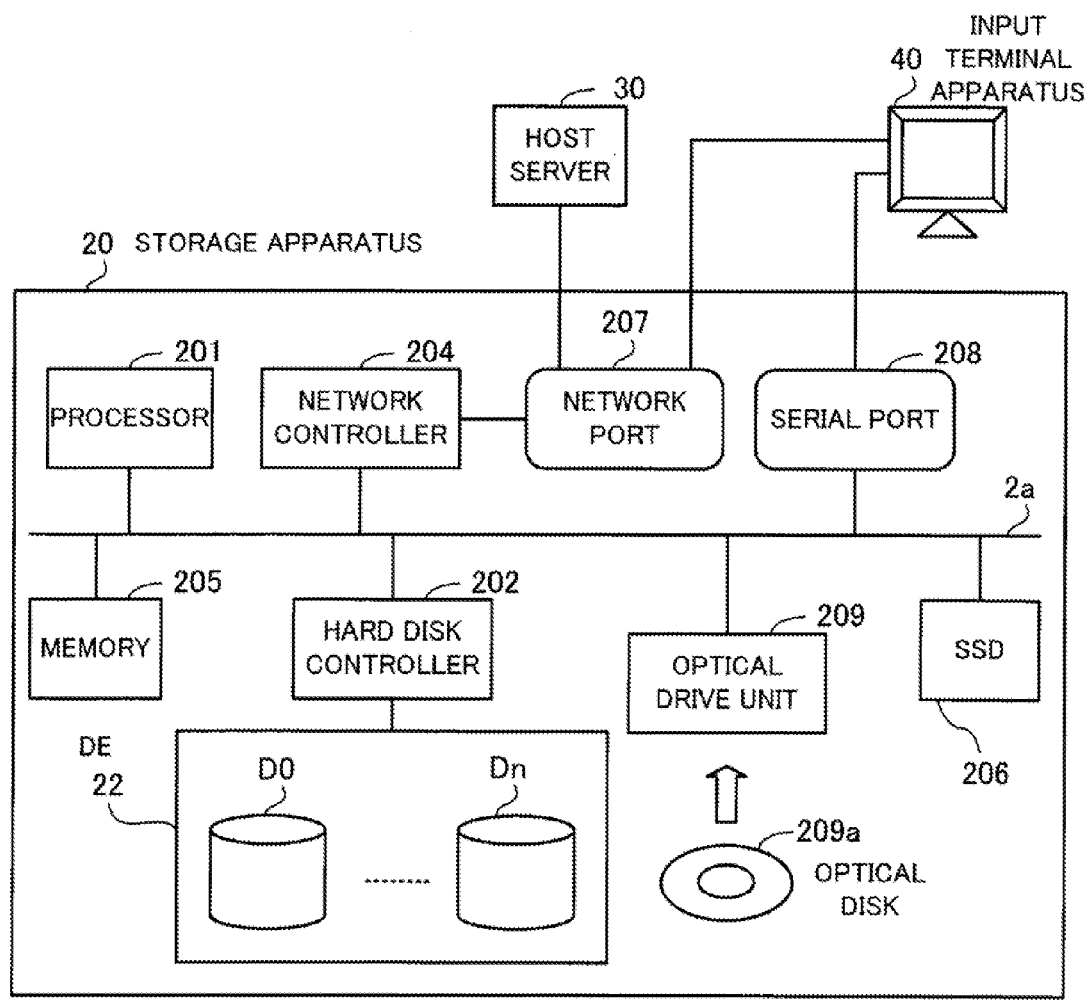
FIG. 6 illustrates an example of the hardware configuration of the storage apparatus.

FIG. 6 illustrates an example of the hardware configuration of the storage apparatus.

The storage apparatus 20 includes a processor 201, a hard disk controller 202, the drive enclosure 22, a network controller 204, a memory 205, an SSD 206, a network port 207, a serial port 208, and an optical drive unit 209.

The processor 201, the hard disk controller 202, the network controller 204, the memory 205, the SSD 206, the serial port 208, and the optical drive unit 209 are interconnected via an internal bus 2a.

The processor 201 is implemented by a CPU, and performs data arrangement control and file system control by executing various kinds of programs. Note that the processor 201 realizes the drive selection unit 213 illustrated in FIG. 3.

The network controller 204 is implemented e.g. by a dedicated chip for network control, and controls the interface with an external network via the network port 207.

The hard disk controller 202 corresponds e.g. to a SAS (Serial Attached SCSI (Small Computer System Interface)) controller, and realizes the RAID controller 212 illustrated in FIG. 3.

The hard disk controller 202 controls writing and reading of data into and out of hard disks D0 to Dn within the drive enclosure 22, based on instructions from the processor 201.

The memory 205 corresponds e.g. to a RAM. The SSD 206, which has a control procedure-storing area, stores a various kinds of programs describing procedures of operation of the storage apparatus 20.

For example, the programs for the RAID control, the file system control, the data arrangement control, and so forth, are stored in the control procedure-storing area. Note that each of these programs is read out, stored and loaded into the memory 205, and is then executed by the processor 201.

The network port 207 is connected to the input terminal apparatus 40 by a LAN cable, and the serial port 208 is connected to the input terminal apparatus 40 by a serial cable. The network port 207 and the serial port 208 function as interface ports for performing communication with external apparatuses. Note that the host server 30 illustrated in FIG. 3 is also connected to the network port 207 by a LAN cable. The optical drive unit 209 reads data recorded in an optical disk 209a using e.g. laser light.

With the hardware configuration as above, it is possible to realize the above-described functions of processing of the present embodiment. Further, when the above-described functions of processing of the present embodiment are realized by a computer, a program in which details of processing by the functions of the storage apparatus 20 is written is provided.

By carrying out the program by the computer, the above-described functions of processing are realized on the computer. The program in which details of processing is written may be recorded in a record medium which is capable of being read by the computer. Examples of the record medium which is capable of being read by the computer include a magnetic recording system, an optical disk, a magneto-optical medium, a semiconductor memory or the like. Examples of the magnetic recording system include a hard disk device (HDD), a flexible disk (FD), a magnetic tape. Examples of the optical disk include a DVD, a DVD-RAM, a CD-ROM, a CD-R/RW. Examples of the magneto-optical medium include an MO (Magneto-Optical disk). Note that a temporary propagation signal itself is not included in the recording medium in which the program is written.

In case of distributing programs, for example, portable record mediums, such as DVD, CD-ROM or the like in which the program is recorded are marketed. Further, it is also possible to store the program in a storing device of a server computer, and transfer the program from the server computer to the other computer via a network.

The computer which carries out the program stores, for example, the program which is recorded in the portable record medium, or is transferred from the server computer in the storing device thereof. Then, the computer reads out the program from the storing device thereof, and carries out the processes according to the program. Note that the computer is also capable of directly reading out the program from the portable record medium, and carrying out the processes according to the program. Further, the computer is also capable of carrying out the processes according to the program which is received, each time the program is transferred from the server computer.

Further, it is also possible to realize at least part of the above-described functions of processing by an electronic circuit, such as a DSP (Digital Signal Processor), an ASIC (Application Specific Integrated Circuit), or a PLD (Programmable Logic Device).

Next, a description will be given of a process executed by the drive selection unit 213 using a flowchart.

Figure 7:
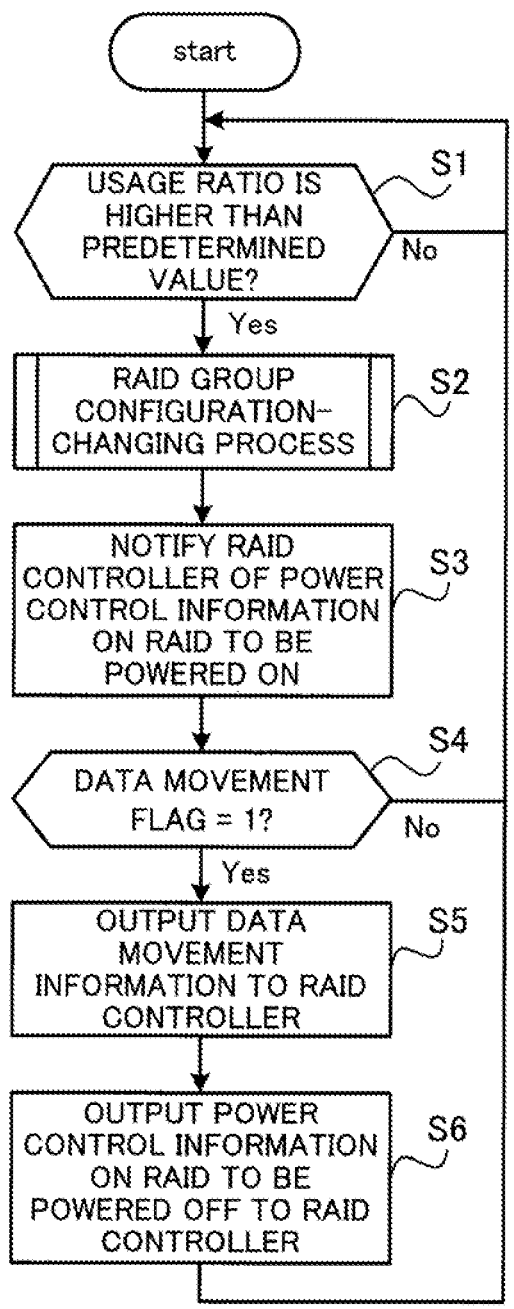
FIG. 7 is a flowchart of a process executed by a drive selection unit.

FIG. 7 is a flowchart of the process executed by the drive selection unit 213.

[Step S1] The drive selection unit 213 determines whether or not the usage ratio of the storage area of the operating RAID set is higher than 60%. Note that the reference value of 60% is given only by way of example, and a designer may set the same to a desired value. If the usage ratio of the storage area of the operating RAID set is higher than 60% (Yes to the step S1), the process proceeds to a step S2. If the usage ratio of the storage area of the operating RAID set is not higher than 60% (No to the step S1), the step S1 is repeatedly executed.

[Step S2] The drive selection unit 213 executes a RAID group configuration-changing process for changing the configuration of the RAID groups belonging to the operating RAID set. Then, the process proceeds to a step S3. The RAID group configuration-changing process will be described in detail hereinafter.

[Step S3] The drive selection unit 213 generates electric power control information on a RAID group to be powered on based on a result of the RAID group configuration-changing process. Then, the drive selection unit 213 outputs the generated electric power control information to the RAID controller 212. Then, the process proceeds to a step S4.

[Step S4] The drive selection unit 213 refers to the result of the RAID group configuration-changing process, and determines whether or not a data movement flag, referred to hereinafter, is equal to 1. If the data movement flag is equal to 1 (Yes to the step S4), the process proceeds to a step S5. If the data movement flag is not equal to 1 (No to the step S4), the process returns to the step S1, and the step S1 et seq. continue to be executed.

[Step S5] The drive selection unit 213 generates data movement information based on the result of the RAID group configuration-changing process. Then, the drive selection unit 213 outputs the generated data movement information to the RAID controller 212. Then, the process proceeds to a step S6.

[Step S6] The drive unit 213 generates power control information of a RAID group to be powered off based on the result of the RAID group configuration changing process. Then, the drive selection unit 213 outputs the generated power control information to the RAID controller 212. Then, the process returns to the step S1, and the step S1 et seq. continue to be executed.

Next, the RAID group configuration-changing process in the step S2 will be described.

Figure 8:
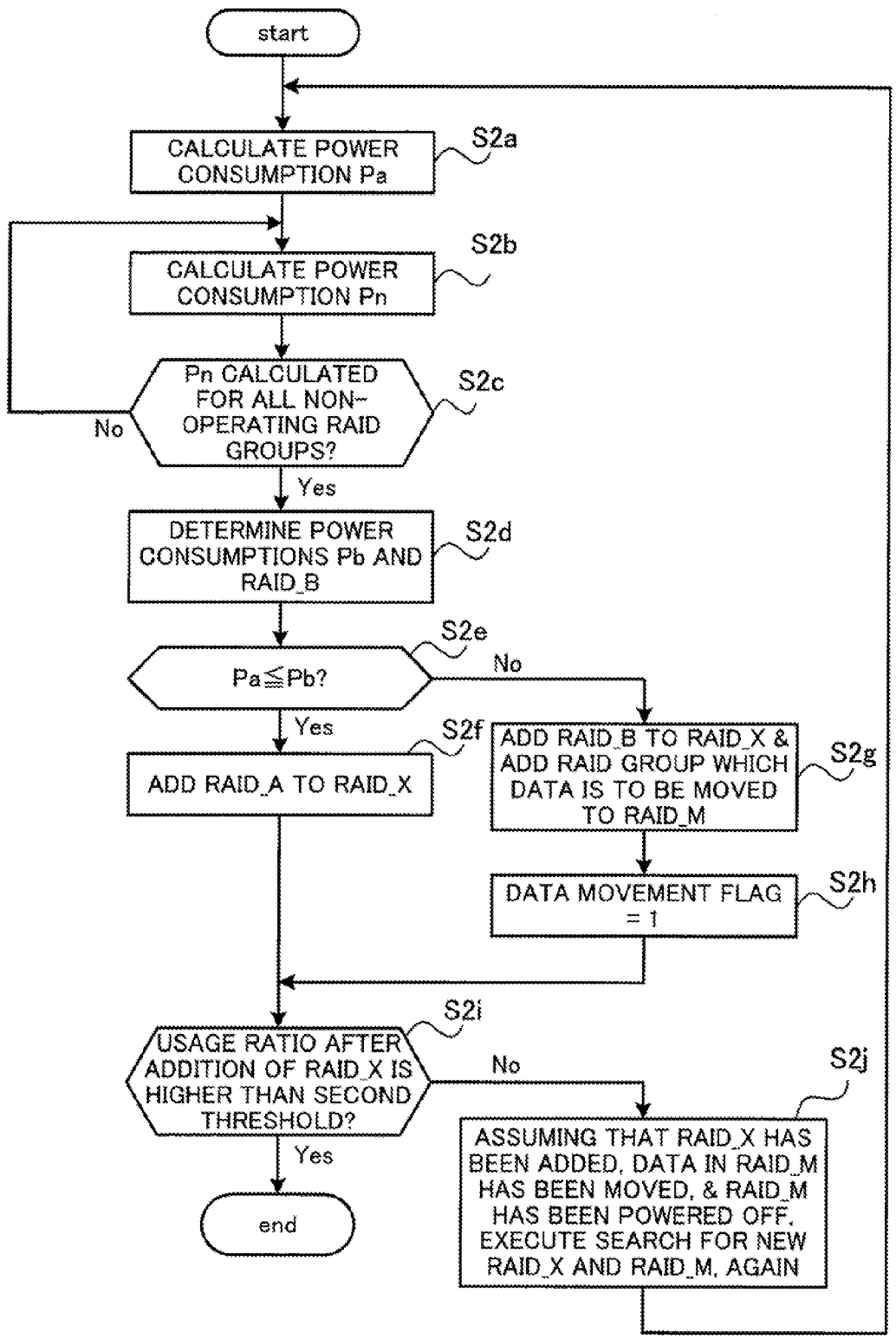
FIG. 8 is a flowchart of RAID group configuration-changing process.

FIG. 8 is a flowchart of the RAID group configuration-changing process.

[Step S2a] The drive selection unit 213 calculates a power consumption Pa to be exhibited when the power consumption of the RAID_A which consumes the least electric power of the RAID groups belonging to the non-operating RAID set is added to the total power consumption of the RAID groups belonging to the operating RAID set. Then, the process proceeds to a step S2b.

[Step S2b] The drive selection unit 213 selects one of the RAID groups belonging to the non-operating RAID set. Then, the drive selection unit 213 calculates a total power consumption to be exhibited when the selected RAID group is added to the operating RAID set. Further, the drive selection unit 213 calculates the power consumption Pn by subtracting the total power consumption of RAID groups belonging to the operating RAID set, from which data is movable to the added RAID group, from the calculated total power consumption. The drive selection unit 213 stores the calculated power consumption Pn in association with the selected RAID group. Then, the process proceeds to a step S2c.

[Step S2c] The drive selection unit 213 determines whether or not the power consumption Pn has been calculated for each of all RAID groups belonging to the non-operating RAID set. If the power consumption Pn has been calculated for each of all RAID groups belonging to the non-operating RAID set (Yes to the step S2c), the process proceeds to a step S2d. If there is any RAID group belonging to the non-operating RAID set, for which the power consumption Pn has not been calculated (No to the step S2c), the process proceeds to the step S2b, wherein the step S2b et seq. continue to be executed.

[Step S2d] The drive selection unit 213 selects a smallest value of the power consumption Pn calculated in the step S2b as a power consumption Pb. The RAID group giving the power consumption Pb is set to RAID_R. Thereafter, the process proceeds to a step S2e.

[Step S2e] The drive selection unit 213 determines whether or not the power consumption Pa is not higher than the power consumption Pb. If the power consumption Pa is not higher than the power consumption Pb (Yes to the step S2e), the process proceeds to a step S2f. If the power consumption Pa is higher than the power consumption Pb (No to the step S2e), the process proceeds to a step S2g.

[Step S2f] The drive selection unit 213 determines to activate the RAID_A. When the drive selection unit 213 determines to activate the RAID_A, the drive selection unit 213 adds the RAID_A to RAID_X indicative of a RAID group to be added to the operating RAID set. Then, the process proceeds to a step S2*i*.

[Step S2*g*] The drive selection unit 213 determines to activate the RAID_B. When the drive selection unit 213 determines to activate the RAID_B, the drive selection unit 213 adds the RAID_B to the RAID_X. Further, the drive selection unit 213 adds a RAID group from which the data is moved to the RAID_X to RAID_M. Then, the process proceeds to a step S2*h*.

[Step S2*h*] The drive selection unit 213 sets the data movement flag to 1. The fact that the data movement flag is set to 1 indicates that the condition for moving the data is satisfied. Note that an initial value of the data movement flag is 0.

[Step S2*i*] The drive selection unit 213 determines whether or not the usage ratio of the storage area of the operating RAID set after the RAID_X has been added to the operating RAID set is not higher than 40%. Although the reference value of 40% is given only by way of example and the designer may set the same to a desired value, it is preferable to set the reference value to a percentage lower than the percentage set in the step S1 in FIG. 7 (60% in the present embodiment). If the usage ratio of the storage area of the operating RAID set after the RAID_X has been added to the operating RAID set is not higher than 40% (Yes to the step S2*i*), the process in FIG. 8 is terminated, whereas if the usage ratio of the storage area of the operating RAID set after the RAID_X has been added to the operating RAID set is higher than 40% (No to the step S2*i*), the process proceeds to a step S2*j*.

[Step S2*j*] The drive selection unit 213 assumes that the RAID_X has been added to the operating RAID set. Further, the drive selection unit 213 assumes that the data stored in the RAID_M has been moved to the RAID_X. Then, the drive selection unit 213 assumes that all HDDs assigned to the RAID_M have been powered off. Then, the process proceeds to the step S2*a*, and the step S2*a* et seq. continue to be executed with above-mentioned assumption. For example, in the step S2*a*, if the RAID_A has been determined as the RAID_X to be added based on the determination in the preceding execution of the step S2*e*, the drive selection unit 213 selects a RAID group which consumes the least electric power next to the RAID group selected as the RAID_A in the preceding execution of the step S2*a*, as the RAID_A. Further, if the RAID_B has been determined as the RAID_X to be added based on the determination in the preceding execution of the step S2*e*, the drive selection unit 213 selects the RAID group which has been selected as the RAID_A in the preceding execution of the step S2*a*, as the RAID_A again.

Next, a description will be given of a method of generating the data movement information and the power control information by the drive selection unit 213 based on a result of the RAID group configuration-changing process.

In the step S3, the drive selection unit 213 generates the power control information for powering on the physical drives assigned to the RAID_X. The RAID controller 212 powers on the physical drives assigned to the RAID_X based on the power control information.

In the step S5, the drive selection unit 213 generates the data movement information for moving the data stored in the physical drives assigned to the RAID_M to the physical drives assigned to the RAID_X. The RAID controller 212 moves the data stored in the physical drives assigned to the RAID_M to the physical drives assigned to the RAID_X based on the data movement information.

In the step S6, the drive selection unit 213 generates the power control information for powering off the physical drives assigned to the RAID_M. The RAID controller 212 powers off the physical drives assigned to the RAID_M based on the power control information.

As described above, according to the storage apparatus 20, by executing the process in FIG. 8, the values of the power consumption Pa and Pb are compared, and the configuration of the storage apparatus having the smaller value of the power consumption is employed. This makes it possible to reduce the power consumption.

(c) Third Embodiment

Next, a description will be given of a storage system according to a third embodiment.

The following description will be given mainly of the different points from the above-described second embodiment, while description of the same elements as those of the second embodiment is omitted.

Figure 9:
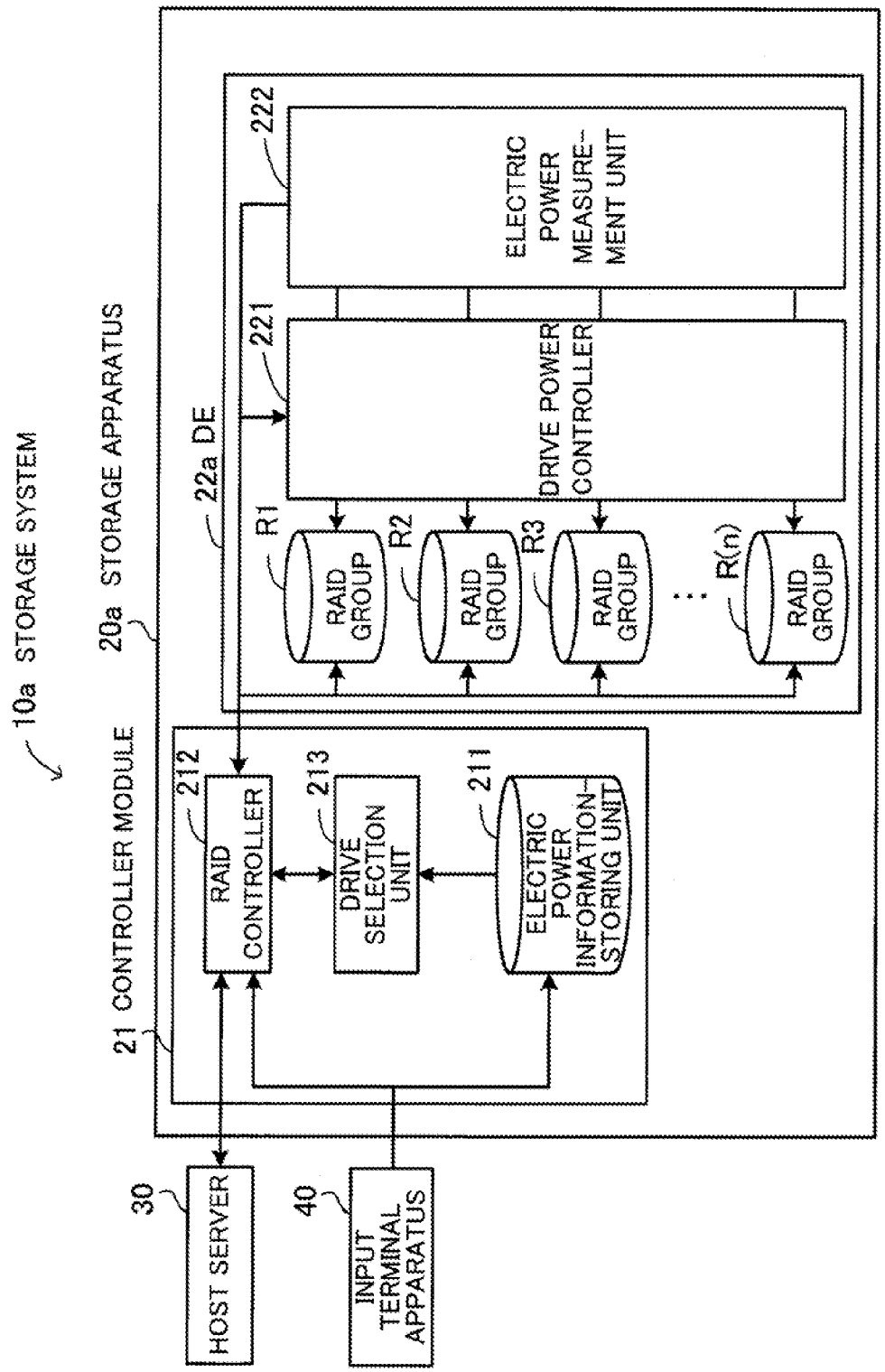
FIG. 9 is a block diagram of a storage system according to a third embodiment.

FIG. 9 is a block diagram of the storage system according to the third embodiment.

A storage apparatus 20*a* included in the storage system, denoted by reference numeral 10*a*, illustrated in FIG. 9 according to the third embodiment is different from the second embodiment in the configuration of a drive enclosure 22*a*, and is the same as for the rest.

The drive enclosure 22*a* includes an electric power measurement unit 222 which measures the power consumption of a physical drive assigned to a RAID group.

The RAID controller 212 writes the power consumption of each physical drive measured by the electric power measurement unit 222 in an electric power information table 211*a* stored in the electric information-storing unit 211. The timing at which information on the power consumption is written is set e.g. by the designer in advance.

Figure 10:
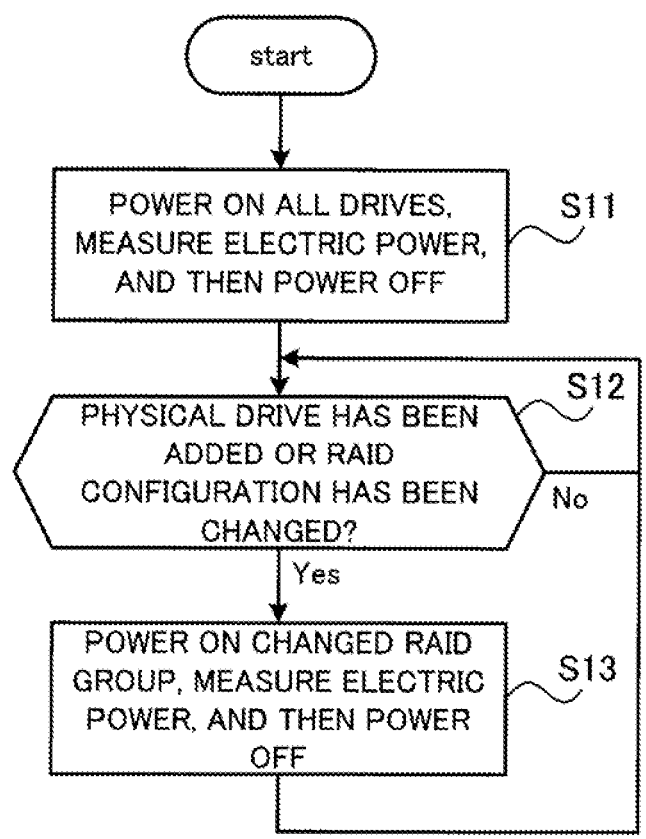
FIG. 10 is a flowchart of a process executed by an electric power measurement unit.

FIG. 10 is a flowchart of a process executed by the electric power measurement unit.

[Step S11] The electric power measurement unit 222 powers on all physical drives included in the drive enclosure 22*a* when the storage apparatus 20*a* is activated, and measures the power consumption of each RAID group. Then, the electric power measurement unit 222 writes a result of measurement in the column of the newer consumption in the electric power information table 211*a*. Thereafter, the electric power measurement unit 222 powers off the physical drives assigned to each RAID group. Then, the process proceeds to a step S12.

[Step S12] The electric power measurement unit 222 consults the RAID configuration information table 212*a* to determine whether or not a physical drive has been added to the drive enclosure 22*a*, and whether or not the RAID configuration has been changed. If a physical drive has been added to the drive enclosure 22*a*, or the RAID configuration has been changed (Yes to the step S12), the process proceeds to a step S13. If no physical drive has been added to the drive enclosure 22*a*, or the RAID configuration has not been changed (No to the step S12), the step S12 continue to be executed.

[Step S13] The electric power measurement unit 222 powers on the physical drives assigned to the RAID group which has been changed in configuration, and measures the power consumption. Then, the electric power measurement unit 222 writes results of measurement in the electric power information table 211*a*. Thereafter, the electric power measurement unit 222 powers off the physical drives assigned to the RAID group which has been changed in configuration. Then, the process proceeds to the step S12.

According to the storage apparatus 20*a* of the third embodiment, it is possible to obtain the same advantageous effects as provided by the storage apparatus 20 of the second embodiment.

Further, according to the storage apparatus 20a of the third embodiment, it is possible to cope with changes in power consumption on a real time basis. Further, it is possible to save the designer from having to write the power consumption in the electric power information table 211a.

(d) Fourth Embodiment

Next, a description will be given of a storage system according to a fourth embodiment.

The following description will be given mainly of the different points from the above-described second embodiment, while description of the same elements as those of the second embodiment is omitted.

Figure 11:
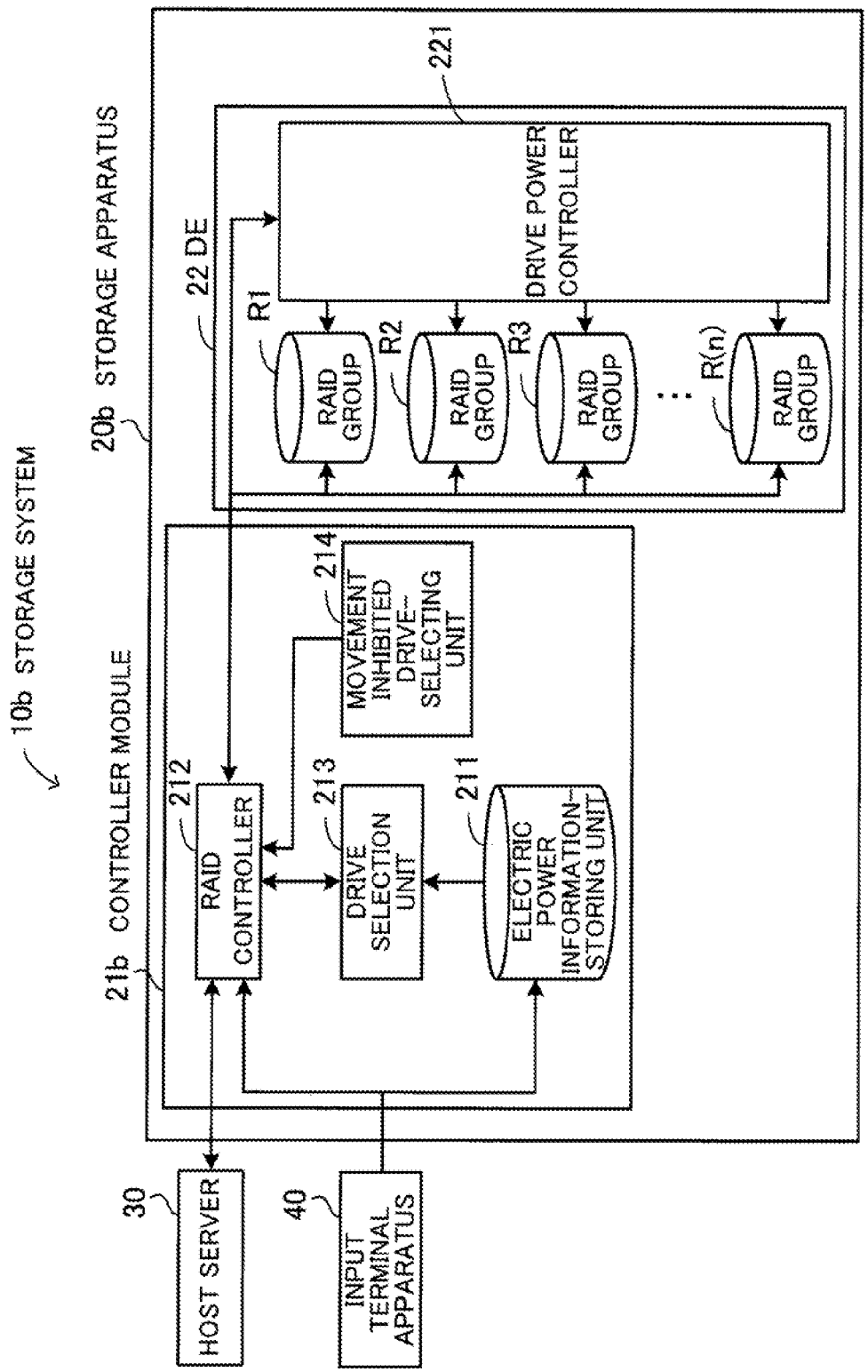
FIG. 11 is a block diagram of a storage system according to a fourth embodiment.

FIG. 11 is a block diagram of the storage system according to the fourth embodiment.

A storage apparatus 20b included in the storage system, denoted by reference numeral 10b, illustrated in FIG. 11 according to the fourth embodiment is different from the second embodiment in the configuration of a controller module 21b, and is the same as for the rest.

The controller module 21b further includes a movement inhibited drive-selecting unit 214.

When the RAID controller 212 receives data to be stored in the drive enclosure 22 from the host server 30, the RAID controller 212 determines, based on a high-speed processing determination information table included in the RAID controller 212, whether or not the received data is data which is inhibited from being moved.

FIG. 13 is a diagram useful in explaining the high-speed processing determination information table.

In the high-speed processing determination information table, denoted by reference numeral 212c, whether or not data needs to be processed at high speed is set by the designer, on a LUN (Logical Unit Number)-by LUN basis. Data sent from the host server 30 includes information on a LUN as a destination where the data is to be written. If "Yes" is set in a column of high-speed processing corresponding to a LUN No. of the destination where the data is to be written, the RAID controller 212 determines that the data received from the host server 30 is movement inhibited data. In the present embodiment, the data requested to be processed at high speed is illustrated as an example of the movement inhibited data. However, the designer may set the data having a desired attribute as the movement inhibited data.

If it is determined that the data received from the host server 30 is movement inhibited data, the RAID controller 212 sends a data size of the movement inhibited data to the movement inhibited drive-selecting unit 214, and requests the movement inhibited drive-selecting unit 214 to notify the RAID controller 212 of a RAID group where the movement inhibited data is to be stored. The RAID controller 212 writes the movement inhibited data in the RAID group notified from the movement inhibited drive-selecting unit 214.

The movement inhibited drive-selecting unit 214 identifies a RAID group which is to store movement inhibited based on the RAID configuration information table and the data size, and notifies the RAID controller 212 of the identified RAID group.

FIG. 12 is a diagram useful in explaining the RAID configuration information table according to the fourth embodiment.

The RAID configuration information table, denoted by reference numeral 212b, according to the fourth embodiment further includes columns of data movement permission and IOPS (Input Output Per Second).

In the column of data movement permission, information indicative of whether or not data stored in an associated RAID group is permitted to be moved to a RAID group other than the same is written.

In the column of IOPS, the number of I/O operations which drives assigned to the associated RAID grows are able to perform per second is written.

Next a process executed by the movement inhibited drive-selecting unit 214 will be described using a flowchart.

Figure 14:
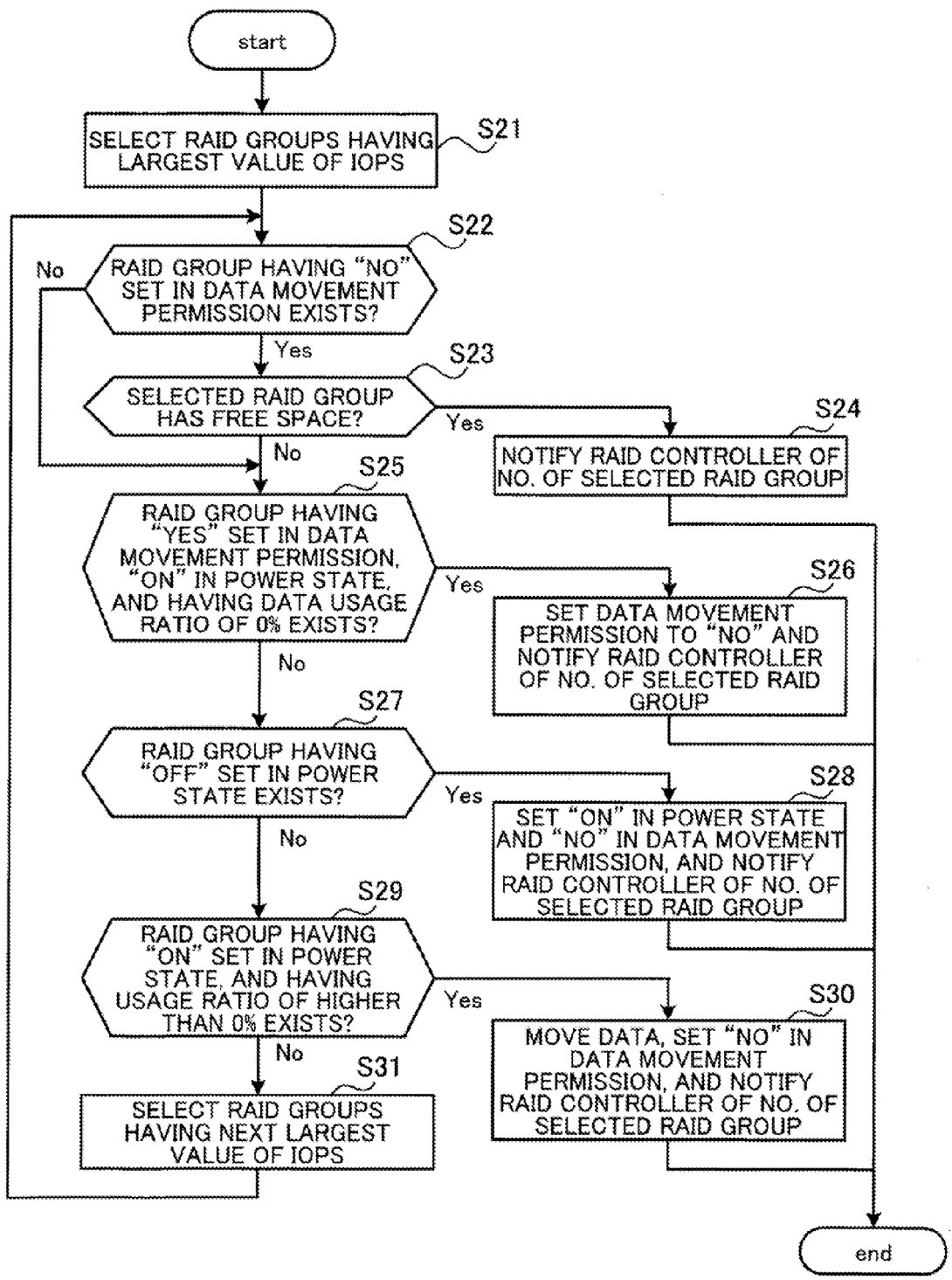
FIG. 14 is a flowchart of a process executed by a movement inhibited drive-selecting unit.

FIG. 14 is a flowchart of a process executed by the movement inhibited drive-selecting unit.

[Step S21] The movement inhibited drive selecting unit 214 refers to the column of IOPS of the RAID configuration information table 212b, and selects RAID groups having a largest value as a selected IOPS value. Then, the process proceeds to a step S22.

[Step S22] The movement inhibited drive-selecting unit 214 refers to the column of data movement permission in the RAID configuration information table 212b to determine whether or not there is a RAID group having "No" set in the column of data movement permission among the RAID groups having the selected IOPS value. If there is a RAID group set to inhibition of data movement therefrom (Yes to the step S22), the process proceeds to a step S23. If there is no RAID group set to inhibition of data movement therefrom (No to the step S22), the process proceeds to a step S25.

[Step S23] The movement inhibited drive selecting unit 214 determines, based on the usage ratio information managed by the RAID controller 212, whether or not the RAID group set to inhibition of data movement therefrom has free space. If the RAID group set to inhibition of data movement therefrom has free space (Yes to the step S23), the process proceeds to a step S24. If the RAID group set to inhibition of data movement therefrom has no free space (No to the step S23), the process proceeds to the step S25.

[Step S24] The movement inhibited drive-selecting unit 214 notifies the RAID controller 212 of No. of the RAID group set to inhibition of data movement therefrom. Then, the process in FIG. 14 is terminated.

[Step S25] The movement inhibited drive-selecting unit 214 refers to the usage ratio information managed by the RAID controller 212 and the column of data movement permission in the RAID configuration information table 212b. Then, the movement inhibited drive-selecting unit 214 determines whether or not there is a RAID group which has "Yes" set in the column of data movement permission and "ON" set in the column of the power state in the RAID configuration information table 212b, and of which the usage ratio is 0%, among the RAID groups each having the selected IOPS. If there is a RAID group satisfying the above-mentioned conditions (Yes to the step S25), the process proceeds to a step S26. If there is no RAID group satisfying the above-mentioned conditions (No to the step S25), the process proceeds to a step S27.

[Step S26] The movement inhibited drive-selecting unit 214 sets "No" in the column of data movement permission in the RAID configuration information table 212b in association with the RAID group satisfying the conditions stated in the step S25. Then, the movement inhibited drive-selecting unit 214 notifies the RAID controller 212 of No. of the RAID group as the conditions stated in the step S25. Then, the process in FIG. 14 is terminated.

[Step S27] The movement inhibited drive-selecting unit 214 refers to the column of the power state in the RAID configuration information table 212b to determine whether or not there is a RAID group having "OFF" set in the column of the power state, among the RAID groups each having the selected IOPS value. If there is a RAID group having "OFF" set in the power state (Yes to the step S27), the process proceeds to a step S28. If there is no RAID group having "OFF" set in the power state (No to the step S27), the process proceeds to a step S29.

[Step S28] The movement inhibited drive-selecting unit 214 changes a setting in the column of the power state of the RAID group having the selected IOPS value in the RAID configuration information table 212b to "ON". Further, the movement inhibited drive-selecting unit 214 changes a setting in the column of data movement permission associated with the RAID group having the selected IOPS value in the RAID configuration information table 212b to "No". Then, the movement inhibited drive-selecting unit 214 notifies the RAID controller 212 of No. of the associated RAID group. Then, the process in FIG. 14 is terminated.

[Step S29] The movement inhibited drive-selecting unit 214 refers to the usage ratio information managed by the RAID controller 212 and the column of data movement permission in the RAID configuration information table 212b. Then, the movement inhibited drive-selecting unit 214 determines whether or not there is a RAID group having "Yes" set in the column of data movement permission and "ON" set in the column of the power state in the RAID configuration information table 212b, and of which the usage ratio is higher than 0%. If there is a RAID group satisfying the above-mentioned conditions (Yes to the step S29), the process proceeds to a step S30. If there is no RAID group satisfying the above-mentioned conditions (No to the step S29), the process proceeds to a step S31.

[Step S30] The movement inhibited drive-selecting unit 214 moves the data stored in the RAID group satisfying the above-mentioned conditions to a RAID group other than the same. Then, the movement inhibited drive-selecting unit 214 changes a setting in the column of data movement permission in the RAID configuration information table 212b associated with the RAID group satisfying the abovementioned conditions to "No". Then, the movement inhibited drive-selecting unit 214 notifies the RAID controller 212 No. of the associated RAID group. Thereafter, the process in FIG. 14 is terminated.

[Step S31] The movement inhibited drive-selecting unit 214 refers to the column of IOPS in the RAID configuration information table 212b, and selects RAID groups each having an IOPS value which is next largest to that of the RAID group on which investigation has been currently made. Then, the process proceeds to the step S22, wherein the step S22 et seq. are repeatedly executed.

According to the storage apparatus 20b of the fourth embodiment, it is possible to obtain the same advantageous effects as provided by the storage apparatus 20 of the second embodiment.

Further, according to the storage apparatus 20b of the fourth embodiment, it is further possible to prevent the data writing speed from being reduced.

According to the aspect of the present invention, it is possible to reduce the power consumption.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various chances, substitutions, and alterations could be made hereto without departing from the spirit and scope of the invention.

What is claimed is:

1. A storage apparatus comprising:
a control unit configured to calculate a first power consumption by adding a power consumption of a first storage device which has not been in use to a total power consumption of a plurality of storage devices in operation, calculate a second power consumption by adding a power consumption of a second storage device which has not been in use to the total power consumption of the plurality of storage devices in operation, and subtracting therefrom a power consumption of a storage device, from which data is movable to the second storage device, of the plurality of storage devices in operation, determine to activate the first storage device when the second power consumption is not lower than the first power consumption, and determine to activate the second storage device when the second power consumption is lower than the first power consumption.

2. The storage apparatus according to claim 1, wherein the power consumption of the first storage device which has not been in use is a power consumption of a storage device which consumes the least electric power of the plurality of storage devices which have not been in use.

3. The storage apparatus according to claim 1, wherein the power consumption of the storage device from which data is movable to the second storage device is, in a case where one or more storage devices are selected out of the plurality of storage devices an operation, and the second storage device has an amount of free space not smaller than a predetermined amount at a time when data stored in selected storage devices is moved to the second storage device, the power consumption of the selected storage devices.

4. The storage apparatus according to claim 1, wherein the second power consumption is, in a case where a plurality of storage devices which have not been in use are sequentially selected, and a total power consumption at a time when the selected storage device is activated is calculated by adding a power consumption of the selected storage device to the total power consumption of the plurality of storage devices in operation, and subtracting therefrom a power consumption of a storage device, from which data is movable to the selected storage device, of the plurality of storage devices in operation, a smallest one of thus calculated total power consumptions.

5. The storage apparatus according to claim 1, further comprising an electric power meter configured to measure the power consumption of each of a plurality of storage devices in operation, and temporarily power on a storage device which has not been in use to measure a power consumption of the storage device which has not been in use.

6. The storage apparatus according to claim 1, wherein the control unit controls a predetermined storage device of the plurality of storage devices in operation, based on management information for managing each of the plurality of storage devices in operation as to whether or not to permit movement of data therefrom to the second storage device, such that movement of data from the predetermined storage device to the second storage device is not permitted.

7. The storage apparatus according to claim 6, wherein when it is determined to activate the first storage device, the control unit activates the first storage device, and when it is determined to activate the second storage device, the control unit activates the second storage device, moves data stored in the storage device, from which data is movable to the second storage device, of the plurality of storage devices in operation, to the second storage device, and stops the operation of the storage device from which data is movable.

8. A method of determining a storage device to be activated, comprising:
- calculating, by a processor, a first power consumption by adding a power consumption of a first storage device which has not been in use to a total power consumption of a plurality of storage devices in operation;
- calculating, by the processor, a second power consumption by adding a power consumption of a second storage device which has not been in use to the total power consumption of the plurality of storage devices in operation, and subtracting therefrom a power consumption of a storage device, from which data is movable to the second storage device, of the plurality of storage device in operation; and
- determining, by the processor, to activate the first storage device when the second power consumption is not lower than the first power consumption, and to activate the second storage device when the second power consumption is lower than the first power consumption.

9. A non-transitory computer-readable storage medium storing a computer program causing a computer to perform a procedure, the procedure comprising:
- calculating a first power consumption by adding a power consumption of a first storage device which has not been in use to a total power consumption of a plurality of storage devices in operation;
- calculating a second power consumption by adding a power consumption of a second storage device which has not been in use to the total power consumption of the plurality of storage devices in operation, and subtracting therefrom a power consumption of a storage device, from which data is movable to the second storage device, of the plurality of storage devices in operation; and
- determining to activate the first storage device when the second power consumption is not lower than the first power consumption, and to activate the second storage device when the second power consumption is lower than the first power consumption.

* * * * *